(12) United States Patent
Poornachandran et al.

(10) Patent No.: US 10,380,037 B2
(45) Date of Patent: Aug. 13, 2019

(54) SECURE DATA TRANSFER WITH COMPUTE STICK

(71) Applicant: Intel Corporation, Santa Clara, CA (US)

(72) Inventors: Rajesh Poornachandran, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/998,050

(22) Filed: Dec. 24, 2015

(65) Prior Publication Data

US 2017/0185540 A1 Jun. 29, 2017

(51) Int. Cl.
*G06F 13/10* (2006.01)

(52) U.S. Cl.
CPC .................................. *G06F 13/102* (2013.01)

(58) Field of Classification Search
None
See application file for complete search history.

(56) References Cited

U.S. PATENT DOCUMENTS

| | | | |
|---|---|---|---|
| 9,189,091 B2 | 11/2015 | Koenig et al. | |
| 2011/0271296 A1* | 11/2011 | Tu | H04N 5/44543 725/25 |
| 2012/0023265 A1* | 1/2012 | Liao | G06F 13/387 710/5 |
| 2012/0299831 A1* | 11/2012 | Lioy | G06F 21/36 345/168 |
| 2013/0318577 A1* | 11/2013 | Bulusu | G06F 21/00 726/5 |
| 2013/0347064 A1* | 12/2013 | Aissi | G06F 21/30 726/2 |
| 2014/0095890 A1 | 4/2014 | Mangalore et al. | |
| 2014/0325532 A1* | 10/2014 | Sarukhanov | G06F 13/102 719/321 |
| 2015/0074745 A1 | 3/2015 | Stern et al. | |
| 2015/0281186 A1 | 10/2015 | Smith et al. | |
| 2016/0027399 A1* | 1/2016 | Wilde | G06F 13/382 345/520 |

(Continued)

FOREIGN PATENT DOCUMENTS

| | | | | |
|---|---|---|---|---|
| WO | 2014-151397 A1 | 9/2014 | | |
| WO | WO 2014151397 A1 * | 9/2014 | ........... | G06F 13/382 |

OTHER PUBLICATIONS

Wikipedia, "HDMI-CEC", retrieved from en.wikipedia.org/wiki/HDMI#CEC, Dec. 21, 2015, 18 pages.

(Continued)

*Primary Examiner* — Ilwoo Park
(74) *Attorney, Agent, or Firm* — Jordan IP Law, LLC

(57) ABSTRACT

Systems, apparatus and methods may provide for creating a communication path through a secure data interface that includes an electronic device control channel between a small form factor computing apparatus such as a compute stick and an external display. A second communication path may be established between a trusted execution environment region of the external display and a trusted execution environment region of the compute stick such that data may be securely transmitted between the compute stick and the external display through the first and second communication paths.

21 Claims, 3 Drawing Sheets

(56) References Cited

U.S. PATENT DOCUMENTS

| | | | |
|---|---|---|---|
| 2016/0036826 A1* | 2/2016 | Pogorelik | H04L 63/105 726/1 |
| 2016/0182518 A1* | 6/2016 | Smith | H04L 63/10 726/3 |
| 2016/0226657 A1* | 8/2016 | Thom | G06F 21/57 |
| 2016/0254904 A1* | 9/2016 | Hjelm | H04L 9/006 713/155 |
| 2016/0314468 A1* | 10/2016 | Smith | G07F 7/1041 |
| 2017/0091467 A1* | 3/2017 | Pogorelik | G06F 17/24 |

OTHER PUBLICATIONS

"Building Trusted Relationships: Intel Identify Protection Technology with Protected Transaction Display", Technology Brief, Intel Identity Protection Technology, Intel Corporation, 2014, 2 pages.

Dhanya Jr, "Miracast—Wireless Devices to Seamless Video Display", iWave Systems Technology, Dec. 21, 2015, 4 pages.

"Introducing the Intel Compute Stick", retrieved from intel.com/content/www/us/en/compute-stick/intel-compute-stick.html, Intel Corporation, Dec. 21, 2015, 12 pages.

International Search Report and Written Opinion for International Patent Application No. PCT/US2016/063535, dated Mar. 16, 2017, 14 pages.

International Preliminary Report on Patentability for International Patent Application No. PCT/US2016/063535, dated Jul. 5, 2018, 11 pages.

* cited by examiner

SECURE DATA TRANSFER WITH COMPUTE STICK

TECHNICAL FIELD

Embodiments generally relate to secure data transfer with a compute stick. More particularly, embodiments relate to secure data transfer between a compute stick and an external display.

BACKGROUND

A compute stick is a small form factor computing device configured to be coupled to an external display such as a monitor or television set. Typically, a compute stick includes a processor, storage, one or more data/power ports, and one or more wireless transceivers, but no power supply. That is, a compute stick must be plugged into an external device to supply power, thus differentiating it from a personal computer, laptop, tablet, mobile Internet, smart phone or other computing devices. Through a compute stick, a user may turn any compatible monitor or television into a fully-functioning computer. Peripherals such as wired/wireless keyboards and mice may be used for input to compute sticks. Alternatively, if the monitor or television includes touch input capability, the touch input method of data entry may be used.

Touch input from an external display, however, may not be secure. As a result, users may be discouraged from using a compute stick to perform sensitive transactions such as banking transactions.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
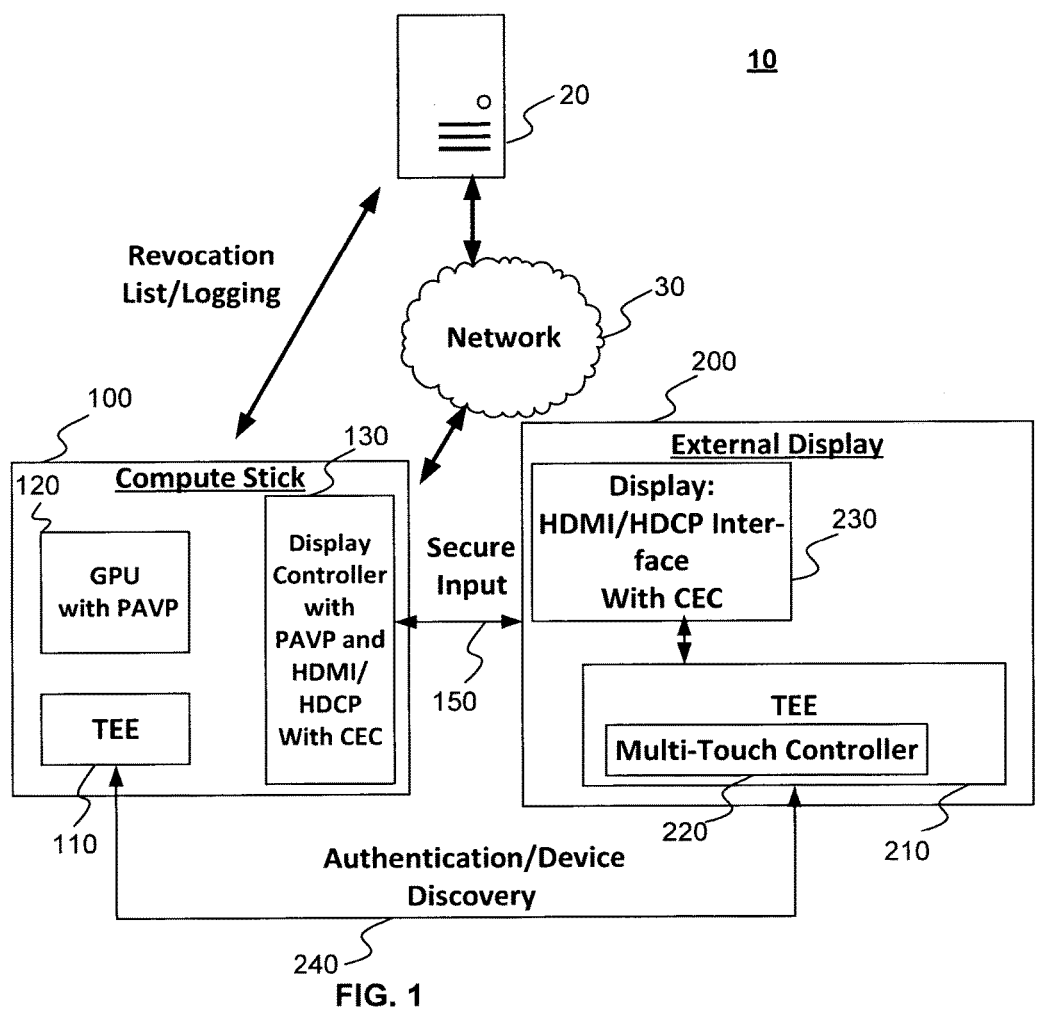
FIG. 1 is an illustration of an example of a system having a compute stick and an external display according to an embodiment.

Turning now to the drawings in detail, FIG. 1 depicts a system 10 that includes a compute stick 100. The compute stick 100 may be a small form factor computing device that may interface with a device having a secure data interface that includes an electronic device control channel. Typically, the compute stick 100 does not include an integrated display, instead being configured to attach to an external device. Sample devices include external displays, monitors or televisions that communicate in accordance with a High-Definition Multimedia Interface (HDMI) standard (e.g., HDMI 1.3 or 1.4, implementing the Consumer Electronics Association/Electronic Industries Alliance 861-E standard, 2012). The HDMI standard also includes content protection known as High-bandwidth Digital Content Protection (HDCP) which may encrypt a signal if required by a source device. Further included in the HDMI standard is Consumer Electronics Control (CEC) that allows a user to control other CEC-enabled devices that are connected through HDMI using a single controller. Individual devices may command and control each other using CEC. HDMI CEC may comprise a one-wire bidirectional serial bus that may use the standard AV.link protocol (e.g., European Committee for Electrotechnical Standardization (CENELEC) EN 50157-1) to perform remote control functions.

As will be discussed in greater detail, the compute stick 100 may generally include a processor, memory, Universal Serial Bus (USB) port (e.g., USB 3.1, USB Implementers Forum 2013), Micro Secure Digital (SD) card reader (e.g., SD Card Association, Version 4.0 2011) and integrated Wi-Fi (e.g., implementing the Institute of Electrical and Electronics/IEEE 802.11 family of standards) and Bluetooth capabilities (Bluetooth Alliance, version 4.2, 2014). However, compute stick 100 does not include its own power supply or battery; it typically may rely upon the external device to which it is connected to receive power.

The compute stick 100 may include a trusted execution environment (TEE) 110. The trusted execution environment may be a secure area within the system on a chip (SoC) of the compute stick. An SoC, as used herein, may be an integrated circuit that integrates the components of a computer on a single chip. A TEE is a combination of both run-time and storage technology to ensure security. A TEE technology may implement a "key hierarchy," that is, a storage root key and accompanying derived keys that are the same each time the TEE is instantiated. Storage keys may be used to encrypt TEE context (data, settings, policies) and may only be decrypted by the TEE storage key. The TEE storage key may only be revealed to the TEE as it executes within its "region." Hence, the TEE has both a stored "on-the-shelf" context and an execution (active within its region) context.

When a device is powered down, only the execution region is removed, but the storage context remains and can be re-asserted when the region is re-built (rebooted). The executing TEE may write/update context values periodically so that the persistent representation of the TEE is maintained/evolves. Thus, the compute stick 100 includes hardware and logic to initiate a TEE when the compute stick is in operation.

In this TEE secure area, various security features may be provided such as isolating execution of instructions and ensuring code integrity and confidentiality. The TEE may run in parallel with an operating system of the compute stick. Applications that run in the TEE may be able to access the power of the compute stick's processor and memory while hardware may protect and isolate the applications running in the TEE from other applications that are running on the operating system. Security may include cryptography to protect applications running in the TEE from each other.

The compute stick 100 may further include a graphics processing unit (GPU) 120 with a protected audio protected video (PAVP) path. The compute stick 100 may further include a display controller 130 having PAVP and HDMI/HDCP capability with CEC to drive an external display. Through a secure interface 150, such as an HDMI/HDCP interface, the illustrated compute stick 100 communicates with an external display 200. The compute stick 100 may further communicate with a remote server 20 over a network 30. The server 20 may support white-listing/revocation listing to ensure that any devices to be attached to the compute stick 100 are trusted devices. The server 20 may further support dynamic provisioning for peripheral ownership takeover, to be described in more detail below. The server may also support remote logging for a user of the compute stick 100. In this way, a user may access various accounts through the server 20.

The external display 200 may include an HDMI/HDCP interface with CEC 230. The external display 200 may further include a TEE 210. The TEE 210 optionally includes a multi-touch controller 220 for displays with touch capability. Incorporating the multi-touch controller 220 into the TEE 210 of the display 200 may prevent access by malicious software, thereby ensuring that touch input may be used for secure transactions such as banking transactions. The TEE 210 of the external display 200 may communicate with the TEE 110 of the compute stick 100 through a communication path 240, which may be wired or wireless. Through the communication path 240, authentication and device discovery may be performed, as described in more detail below. Alternatively, secure interface 150 may be used for authentication/discovery.

Optionally, additional devices may communicate with compute stick 100 such as wireless peripherals (e.g., mouse, keyboard, not shown). Mobile devices such as smart phones and tablets connected to or communicating with the external display may also be used to input data to the compute stick 100 via the same HDMI/HDCP channel used for communication between the compute stick 100 and the external display 200.

Figure 2:
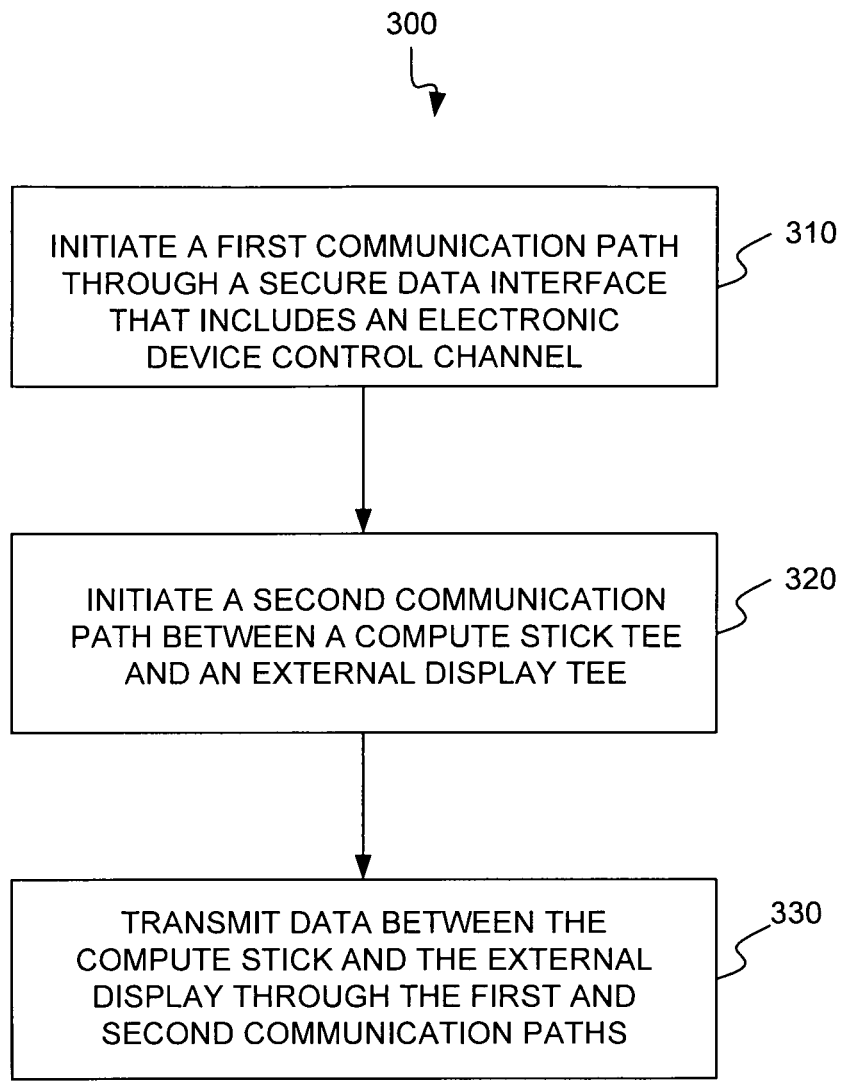
FIG. 2 is a flowchart of an example of creating secure communication according to an embodiment.

FIG. 2 shows an overview method 300 of protecting input data to a compute stick 100 from a device such as the external display 200 The method 300 may generally be implemented in a system such as, for example, the system 10 (FIG. 1), already discussed. More particularly, the method 300 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 300 may be written in any combination of one or more programming languages, including an object oriented programming language such as JAVA, SMALLTALK, C++ or the like and conventional procedural programming languages, such as the "C" programming language or similar programming languages.

Illustrated processing block 310 may provide for creating a first communication path between the compute stick 100 and the external display 200. The first communication path may include a secure data interface that includes an electronic device control channel. HDMI/HDCP with CEC may be employed in the first communication path.

Illustrated processing block 320 may provide for creating a second communication path between a compute stick TEE and an external display TEE. Optionally, the second communication path may be wireless, such as a User Interface Back Channel (UIBC). Illustrated processing block 330 may transmit data between the compute stick and the external display through the first and second communication paths.

Figure 3:
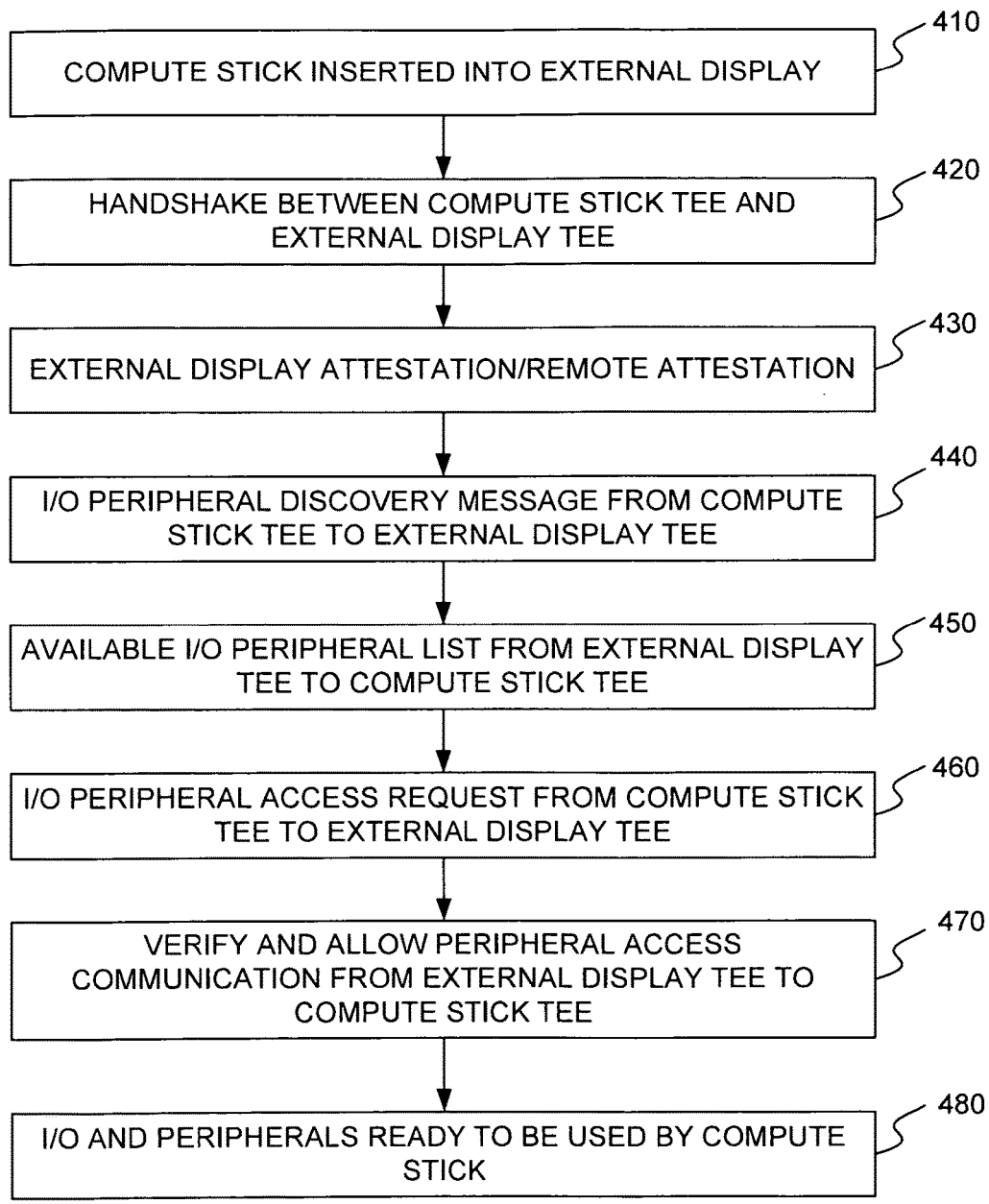
FIG. 3 is a flowchart of a further example of creating secure communication according to an embodiment.

With continuing reference to FIGS. 1 and 3, a method 400 of communication between a compute stick TEE 110 and an external display TEE 210 is shown. In illustrated block 410, a compute stick is coupled to an external display. In an embodiment, an HDMI/HDCP interface may be used as the point of coupling. In illustrated processing block 420, a "handshake" may be performed between the compute stick TEE 110 and the external monitor TEE 210. This "handshake" may include various challenge/response interactions that allow the external display TEE 210 to establish a secure end-to-end tunnel to drive input data, including, optionally, touch data, from the external display 200 to the compute stick 100.

In optional processing block 430, attestation of the external display 200 may be performed. This attestation may be performed in connection with the remote server 20 and the network 30. In processing block 440, I/O peripheral discovery may be performed. That is, the compute stick 100 may identify the peripherals that are managed by the external display TEE 210, particularly those involved in secure input. For example, as shown in FIG. 1, the multi-touch controller 220 in the external display 200 may be securely managed by the TEE 210 in the external display.

In illustrated processing block 450, the available I/O peripheral list may be passed from the external display TEE 210 to the compute stick TEE 110. In illustrated processing block 460, an I/O peripheral access request may be passed from the compute stick TEE 110 to the external display TEE 210. In illustrated processing block 470, verification may be performed to allow peripheral access communication from the external display TEE 210 to the compute stick TEE 110.

Thus, at illustrated processing block 480, the I/O and peripherals may be ready to be used by compute stick 100. In this process, input data from a chosen peripheral on the external display 200 is routed via the path between compute stick TEE 110 and external display TEE 210 for encryption (e.g., HDCP) and data may be sent over the HDMI/HDCP CEC channel securely from the external display 200 to the compute stick 100.

If a user uncouples the compute stick 100 from the external display 200, the compute stick TEE 110 may terminate the session with the external display device TEE 210.

Additional Notes and Examples

Example 1 may include a small form factor computing apparatus comprising hardware and logic to initiate a trusted execution environment region, a secure data interface that includes an electronic device control channel to communicate between the small form factor computing apparatus and an external display having touch input capability, and hardware and logic to receive information securely from an external display trusted execution environment region.

Example 2 may include the computing apparatus of example 1 wherein the external display trusted execution environment region includes a multi-touch controller.

Example 3 may include the computing apparatus of examples 1 or 2, wherein the secure data interface that includes the electronic device control channel is an HDMI/HDCP interface with CEC.

Example 4 may include the computing apparatus of examples 1 or 2 wherein the small form factor computing apparatus is configured to receive its operating power from the external display.

Example 5 may include the computing apparatus of examples 1 or 2 wherein the logic to receive information securely from the external display trusted execution environment region is configured to receive the information wirelessly.

Example 6 may include a method comprising initiating a first communication path through a secure data interface that includes an electronic device control channel between a small form factor computing apparatus and an external display, initiating a second communication path between a trusted execution environment region of the external display and a trusted execution environment region of the small form factor computing apparatus, and transmitting data between the small form factor computing apparatus and the external display through the first and second communication paths.

Example 7 may include the method of example 6, further comprising determining input/output peripherals associated with the external display.

Example 8 may include the method of example 7, further comprising requesting and gaining access/ownership to determined input/output peripherals.

Example 9 may include the method of examples 6, 7, or 8, further comprising communicating with a server to perform attestation of the external display.

Example 10 may include the method of examples 6, 7, or 8, wherein the input data is touch input data from the external display.

Example 11 may include the method of examples 6, 7, or 8, wherein the first communication path is an HDMI/HDCP with CEC communication path.

Example 12 may include the method of examples 6, 7, or 8, wherein the second communication path is wireless.

Example 13 may include the method of examples 6, 7, or 8 wherein initiating the second communication path comprises establishing a secure end-to-end tunnel between the trusted execution environment region of the external display and a trusted execution environment region of the small form factor computing apparatus.

Example 14 may include a computer readable storage medium comprising a set of instructions, which, when executed by a processor, cause a small form factor computing apparatus to initiate a first communication path through a secure data interface that includes an electronic device control channel between a small form factor computing apparatus and an external display, initiate a second communication path between a trusted execution environment region of the external display and a trusted execution environment region of the compute stick to permit data to be transmitted between the small form factor computing apparatus and the external display.

Example 15 may include the medium of example 14, wherein, if executed, the instructions cause a computer to determine input/output peripherals associated with the external display.

Example 16 may include the medium of example 15, wherein, if executed, the instructions cause a computer to request and gain access/ownership to determined input/output peripherals.

Example 17 may include the medium of examples 14, 15, or 16, wherein, if executed, the instructions cause a computer to communicate with a server to perform attestation of the external display.

Example 18 may include the medium of examples 14, 15, or 16, wherein the input data is touch input data from the external display.

Example 19 may include the medium of examples 14, 15, or 16, wherein the first communication path is an HDMI/HDCP with CEC communication path.

Example 20 may include the medium of examples 14, 15, or 16, wherein the second communication path is wireless.

Example 21 may include the medium of examples 14, 15, or 16, wherein initiating the second communication path comprises establishing a secure end-to-end tunnel between the trusted execution environment region of the external display and a trusted execution environment region of the small form factor computing apparatus.

Example 22 may include an apparatus to protect input data to a small form factor computing apparatus comprising means for initiating a first communication path through a secure data interface that includes an electronic device control channel between a compute stick and an external display, means for initiating a second communication path between a trusted execution environment region of the external display and a trusted execution environment region of the compute stick to transmit data between the small form factor computing apparatus and the external display through the first and second communication paths.

Example 23 may include the apparatus of example 22, further comprising means for determining input/output peripherals associated with the external display.

Example 24 may include the apparatus of example 23, further comprising means for requesting access to determined input/output peripherals.

Example 25 may include the apparatus of examples 22, 23, or 24, further comprising means for communicating with a server to perform attestation of the external display.

Example 26 may include the apparatus of examples 22, 23, or 24, wherein the input data is touch input data from the external display.

Example 27 may include the apparatus of examples 22, 23, or 24, wherein the first communication path is an HDMI/HDCP with CEC communication path.

Example 28 may include the apparatus of examples 22, 23, or 24, wherein the second communication path is wireless.

Example 29 may include the apparatus of examples 22, 23, or 24, wherein the means for initiating the second communication path comprises means for establishing a secure end-to-end tunnel between the trusted execution environment region of the external display and a trusted execution environment region of the small form factor computing apparatus.

Advantageously, use of the system, apparatus, and methods described above may permit secure communication between an external display and a small form factor computing device that may be a compute stick. In particular, an external display having touch input capability may securely transmit data to a computer. In this manner, sensitive transactions involving touch input, such as online banking transactions, may be securely performed. Using attestation from an external server, unknown public displays such as kiosks located in public places, may be used for sensitive transactions with a compute stick.

The system/apparatus may be used to enhance user experiences involving the use of a "dumb" display with a compute stick computer to achieve a "smart" display experience. The system may also use a compute stick computer and a "smart" display to enhance the user experience over and above that provided natively by the smart display. For example, the compute stick may provide access to compelling computer games, personal/enterprise productivity applications (involving banking, financial, healthcare, privacy info, etc.), entertainment and enhanced or immersive content consumption. User experience may further be enhanced with the display being equipped with a touch display allowing highly user interactive experiences with the display. Moreover, the enhanced user experiences may be achieved in connection with the consumption of high-value content where a DRM (digital rights management) protection scheme is employed to protect copyrighted material displayed on the display device. The embodiments may enable an integrated seamless user experience involving compute stick and display that is on par with other systems designed with a fully integrated PC (personal computer) despite the fact that the compute stick and display were produced by different vendors.

The compute stick may support wireless interfaces and protocols not supported by a "dumb" or "smart" display including ANT+, ZIGBEE, BLUETOOTH, WiFi, WiMax, LTE and others such that the display may be used with a variety of user interface devices including keyboards, pointers, game controllers, sketch pad controllers etc. The compute stick may also be integrated with home and building automation solutions involving home entertainment control, lighting control, HVAC (heating, ventilation and air conditioning) control and a variety of Internet-of-Things (IOT) sensors, actuators and controllers.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The terms "coupled" and "communicating" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A system comprising:
a compute stick having a compute stick trusted execution environment hardware region providing an area within the compute stick that is secure from any area within the compute stick and outside of the compute stick trusted execution environment hardware region;
an external display having an external display trusted execution environment hardware region providing an area within the external display that is secure from any area within the external display and outside of the external display trusted execution environment hardware region;
a secure data interface that includes an electronic device control channel communicating between the compute stick and the external display; and
a communication path between the compute stick trusted execution environment hardware region and the external display trusted execution environment hardware region;
wherein input/output peripherals associated with the external display are to be determined via communication between the external display trusted execution environment hardware region and the compute stick trusted execution environment hardware region by a receipt of a discovery message at the external display trusted execution environment hardware region from the compute stick trusted execution environment hardware region and a send of an available peripheral list to the compute stick trusted execution environment hardware region from the external display trusted execution environment hardware region;
wherein the compute stick trusted execution environment hardware region includes run-time and storage technology using a storage root key only revealed to the compute stick trusted execution environment hardware region as the compute stick trusted execution environment hardware region executes; and
wherein the communication path comprises a secure end-to-end data tunnel between the external display trusted execution environment hardware region and the compute stick trusted execution environment hardware region to drive input data from the external display to the compute stick.

2. The system of claim 1, wherein the external display includes a touch input capability.

3. The system of claim 2, wherein the external display trusted execution environment hardware region includes a multi-touch controller to provide secure touch input from the external display to the compute stick.

4. The system of claim 1, wherein the secure data interface that includes the electronic device control channel is an HDMI/HDCP interface with CEC.

5. The system of claim 1, wherein the communication path is a wireless communication path.

6. A method comprising:
creating a first communication path through a secure data interface that includes an electronic device control channel between a compute stick and an external display;

creating a second communication path between an external display trusted execution environment hardware region providing an area within the external display that is secure from any area within the external display and outside of the external display trusted execution environment hardware region and a compute stick trusted execution environment hardware region providing an area within the compute stick that is secure from any area within the compute stick and outside of the compute stick trusted execution environment hardware region;

transmitting data between the compute stick and the external display through the first and second communication paths; and determining input/output peripherals associated with the external display via communication between the external display trusted execution environment hardware region and the compute stick trusted execution environment hardware region, wherein determining the input/output peripherals includes receiving a discovery message at the external display trusted execution environment hardware region from the compute stick trusted execution environment hardware region and sending an available peripheral list to the compute stick trusted execution environment hardware region from the external display trusted execution environment hardware region;

wherein the compute stick trusted execution environment hardware region includes run-time and storage technology using a storage root key only revealed to the compute stick trusted execution environment hardware region as the compute stick trusted execution environment hardware region executes; and wherein the second communication path comprises a secure end-to-end data tunnel between the external display trusted execution environment hardware region and the compute stick trusted execution environment hardware region to drive input data from the external display to the compute stick.

7. The method of claim 6, further comprising requesting access to determined input/output peripherals.

8. The method of claim 6, further comprising communicating with a server to perform attestation of the external display.

9. The method of claim 6, wherein the external display includes a touch input capability, and wherein the external display trusted execution environment hardware region includes a multi-touch controller to provide secure touch input data from the external display to the compute stick.

10. The method of claim 6, wherein the first communication path is an HDMI/HDCP with CEC communication path.

11. The method of claim 6, wherein the second communication path is wireless.

12. The method of claim 6, wherein determining the input/output peripherals includes:
sending the discovery message to the display trusted execution environment hardware region from the compute stick trusted execution environment hardware region; and
receiving the available peripheral list at the compute stick trusted execution environment hardware region from the display trusted execution environment hardware region.

13. A computer readable storage medium comprising a set of instructions, which, when executed by a processor, cause a computer to:

create a first communication path through a secure data interface that includes an electronic device control channel between a compute stick and an external display;

create a second communication path between an external display trusted execution environment hardware region providing an area within the external display that is secure from any area within the external display and outside of the external display trusted execution environment hardware region and a compute stick trusted execution environment region providing an area within the compute stick that is secure from any area within the compute stick and outside of the compute stick trusted execution environment hardware region;

transmit data between the compute stick and the external display through the first and second communication paths; and determine input/output peripherals associated with the external display via communication between the external display trusted execution environment hardware region and the compute stick trusted execution environment hardware region by a receipt of a discovery message at the external display trusted execution environment hardware region from the compute stick trusted execution environment hardware region and a send of an available peripheral list to the compute stick trusted execution environment hardware region from the external display trusted execution environment hardware region;

wherein the compute stick trusted execution environment hardware region includes run-time and storage technology using a storage root key only revealed to the compute stick trusted execution environment as the compute stick trusted execution environment hardware region executes; and wherein the second communication path comprises a secure end-to-end data tunnel between the external display trusted execution environment hardware region and the compute stick trusted execution environment hardware region to drive input data from the external display to the compute stick.

14. The medium of claim 13, wherein, if executed, the instructions cause a computer to request access to determined input/output peripherals.

15. The medium of claim 13, wherein, if executed, the instructions cause a computer to communicate with a server to perform attestation of the external display.

16. The medium of claim 13, wherein the external display includes a touch input capability, and wherein the external display trusted execution environment hardware region includes a multi-touch controller to provide secure touch input data from the external display to the compute stick.

17. The medium of claim 13, wherein the first communication path is an HDMI/HDCP with CEC communication path.

18. The medium of claim 13, wherein the second communication path is wireless.

19. A system comprising:
a compute stick having a compute stick trusted execution environment hardware region providing an area within the compute stick that is secure from any area within the compute stick and outside of the compute stick trusted execution environment hardware region;
an external display having an external display trusted execution environment hardware region providing an area within the external display that is secure from any area within the external display and outside of the external display trusted execution environment hardware region;
a secure data interface that includes an electronic device control channel communicating between the compute stick and the external display; and
a communication path between the compute stick trusted execution environment hardware region and the external display trusted execution environment hardware region;
wherein input/output peripherals associated with the external display are to be determined via communication between the external display trusted execution environment hardware region and the compute stick trusted execution environment hardware region by a send of a discovery message to the external display trusted execution environment hardware region from the compute stick trusted execution environment hardware region and a receipt of an available peripheral list at the compute stick trusted execution environment hardware region from the external display trusted execution environment hardware region;
wherein the compute stick trusted execution environment hardware region includes run-time and storage technology using a storage root key only revealed to the compute stick trusted execution environment hardware region as the compute stick trusted execution environment hardware region executes; and
wherein the communication path comprises a secure end-to-end data tunnel between the external display trusted execution environment hardware region and the compute stick trusted execution environment hardware region to drive input data from the external display to the compute stick.

20. A method comprising:
creating a first communication path through a secure data interface that includes an electronic device control channel between a compute stick and an external display;
creating a second communication path between an external display trusted execution environment hardware region providing an area within the external display that is secure from any area within the external display and outside of the external display trusted execution environment hardware region and a compute stick trusted execution environment hardware region providing an area within the compute stick that is secure from any area within the compute stick and outside of the compute stick trusted execution environment hardware region;
transmitting data between the compute stick and the external display through the first and second communication paths; and
determining input/output peripherals associated with the external display via communication between the external display trusted execution environment hardware region and the compute stick trusted execution environment hardware region, wherein determining the input/output peripherals includes sending a discovery message to the external display trusted execution environment hardware region from the compute stick trusted execution environment hardware region and receiving an available peripheral list at the compute stick trusted execution environment hardware region from the external display trusted execution environment hardware region;
wherein the compute stick trusted execution environment hardware region includes run-time and storage technology using a storage root key only revealed to the compute stick trusted execution environment hardware region as the compute stick trusted execution environment hardware region executes; and
wherein the second communication path comprises a secure end-to-end data tunnel between the external display trusted execution environment hardware region and the compute stick trusted execution environment hardware region to drive input data from the external display to the compute stick.

21. A computer readable storage medium comprising a set of instructions, which, when executed by a processor, cause a computer to:
create a first communication path through a secure data interface that includes an electronic device control channel between a compute stick and an external display;
create a second communication path between an external display trusted execution environment hardware region providing an area within the external display that is secure from any area within the external display and outside of the external display trusted execution environment hardware region and a compute stick trusted execution environment region providing an area within the compute stick that is secure from any area within the compute stick and outside of the compute stick trusted execution environment hardware region;
transmit data between the compute stick and the external display through the first and second communication paths; and
determine input/output peripherals associated with the external display via communication between the external display trusted execution environment hardware region and the compute stick trusted execution environment hardware region by a send of a discovery message to the external display trusted execution environment hardware region from the compute stick trusted execution environment hardware region and a receipt of an available peripheral list at the compute stick trusted execution environment hardware region from the external display trusted execution environment hardware region;
wherein the compute stick trusted execution environment hardware region includes run-time and storage technology using a storage root key only revealed to the compute stick trusted execution environment as the compute stick trusted execution environment hardware region executes; and
wherein the second communication path comprises a secure end-to-end data tunnel between the external display trusted execution environment hardware region and the compute stick trusted execution environment hardware region to drive input data from the external display to the compute stick.

* * * * *